United States Patent
Morehouse

(10) Patent No.: US 7,193,618 B2
(45) Date of Patent: Mar. 20, 2007

(54) ELECTRONIC INK BALL POINT PEN WITH MEMORY

(75) Inventor: Charles C. Morehouse, Cupertino, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 658 days.

(21) Appl. No.: 09/726,325

(22) Filed: Dec. 1, 2000

(65) Prior Publication Data

US 2002/0067349 A1    Jun. 6, 2002

(51) Int. Cl.
G09G 5/08    (2006.01)

(52) U.S. Cl. ............... 345/179; 345/156; 345/157; 345/164; 178/19.01

(58) Field of Classification Search ........ 345/156–183; 382/313, 187; 178/19.01–19.06, 20.01
See application file for complete search history.

(56) References Cited

U.S. PATENT DOCUMENTS

| | | | | |
|---|---|---|---|---|
| 4,806,707 A | | 2/1989 | Landmeier ............... 178/18 |
| 5,159,321 A | * | 10/1992 | Masaki et al. ........... 345/179 |
| 5,434,371 A | * | 7/1995 | Brooks ..................... 345/179 |
| 5,691,747 A | * | 11/1997 | Amano ..................... 345/167 |
| 5,861,876 A | * | 1/1999 | Nakayama ................ 345/179 |
| 5,864,490 A | | 1/1999 | Van Bost .................. 364/708.1 |
| 5,877,459 A | | 3/1999 | Prater ...................... 178/19.06 |
| 5,907,130 A | * | 5/1999 | Suzuki ..................... 178/19.01 |
| 5,939,702 A | * | 8/1999 | Knighton et al. ......... 235/472.03 |
| 5,963,195 A | * | 10/1999 | Gregg et al. ............. 345/159 |
| 6,104,388 A | * | 8/2000 | Nagai et al. ............. 345/179 |
| 6,130,666 A | * | 10/2000 | Persidsky ................. 345/179 |
| 6,188,392 B1 | * | 2/2001 | O'Conner et al. ........ 345/179 |
| 6,335,727 B1 | * | 1/2002 | Morishita et al. ........ 345/179 |
| 6,353,427 B1 | * | 3/2002 | Rosenberg ............... 345/156 |
| 6,422,775 B1 | * | 7/2002 | Bramlett et al. ......... 401/195 |
| 6,486,875 B1 | * | 11/2002 | O'Donnell, Jr. .......... 345/179 |
| 2002/0031243 A1 | * | 3/2002 | Schiller et al. ........... 382/187 |
| 2002/0054024 A1 | * | 5/2002 | Stevenson et al. ....... 345/173 |

* cited by examiner

*Primary Examiner*—Bipin Shalwala
*Assistant Examiner*—David L. Lewis

(57) ABSTRACT

An electronic pen for recording motion data relating to use of the pen. It includes a pen body and a ball mounted in the pen body. A sensor in the pen body, located proximate the ball, detects motion of the ball and converts the motion into corresponding electronic signals. A memory in the pen body, electronically coupled to the sensor, receives the electronic signals and stores corresponding data related to the motion. Use of a high-density memory, such as an atomic resolution storage memory, permits recording sufficient data for the motion within a memory module small enough to fit within the pen body.

21 Claims, 5 Drawing Sheets

ELECTRONIC INK BALL POINT PEN WITH MEMORY

FIELD OF THE INVENTION

The present invention relates to an electronic pen for recording motion data.

BACKGROUND OF THE INVENTION

Electronic pens are known in the art and typically include a pen with a corresponding tablet or a pen with a tether cable connecting it to a computer or computing device. A user may put paper or another medium on the tablet and the motion of the pen as the user writes on the paper is detected by the tablet. The tablet electronically stores the motion data. These types of systems, however, require use of a specialized tablet for detecting motion of the pen or a tether connecting the pen to a computer or computing device. Also, the pens alone typically have limited memory capability and are thus dependent upon the specialized tablet or the tethered computer for the memory needed to capture motion data desired. Accordingly, a need exists for an improved electronic pen.

SUMMARY OF THE INVENTION

An electronic pen consistent with the present invention records motion data relating to use of the pen. It includes a pen body and a ball mounted in the pen body. A sensor in the pen body, located proximate the ball, detects motion of the ball and converts the motion into corresponding electronic signals. A memory in the pen body, electronically coupled to the sensor, receives the electronic signals and stores corresponding data related to the motion.

A method consistent with the present invention records motion data relating to use and motion of an electronic pen. The method includes detecting motion of a ball in the pen using a sensor and converting the motion into corresponding electronic signals. The electronic signals are received and used to store in a memory corresponding data related to the motion of the pen.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

Figure 1:
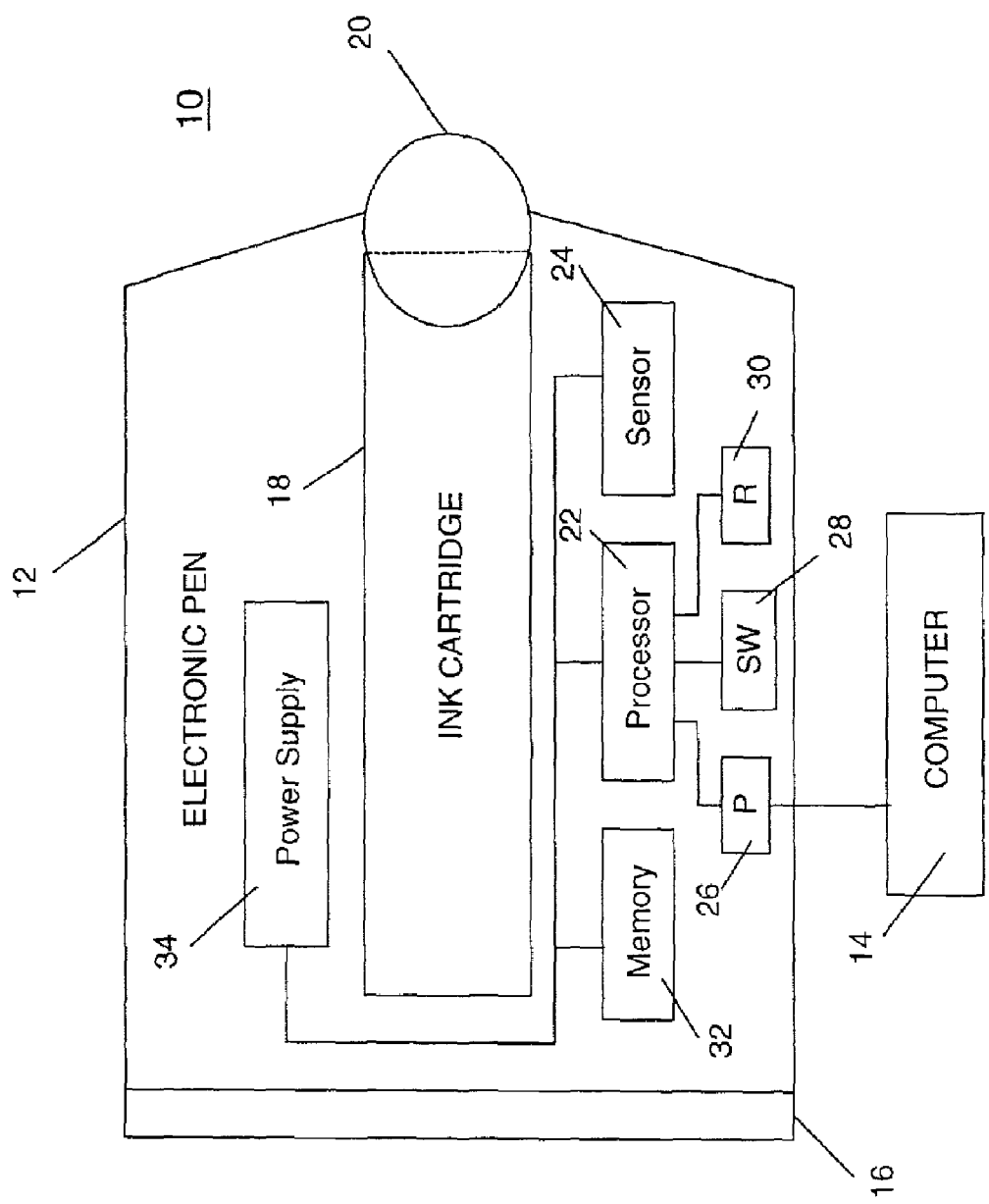
FIG. 1 is a diagram of an electronic pen consistent with the present invention.

FIG. 1 is a diagram of an exemplary electronic pen 10 consistent with the present invention. Electronic pen 10 includes a pen body 12 with a cap 16. Cap 16 is typically removable such as through threading in order to access the interior of pen body 12. Pen body 12 contains a conventional ink cartridge 18 for applying ink to a ball point 20. Electronic pen 10 thus may function as a typical ink ball point pen. In addition, electronic pen 10 includes circuitry for detecting motion of ball point 20 and recording data representing that motion. A processor 22 is connected with a sensor 24, which detects motion of ball point 20 and transmits corresponding electronic signals to processor 22. Based upon the electronic signals, processor 22 records corresponding motion data in a memory 32. A power supply 34, such as batteries, provide power to memory 32, processor 22, and sensor 24. By using certain types of memories to implement memory 32, such as an atomic resolution storage (ARS) memory, a substantial amount of data can be recorded on a memory small enough to fit within pen body 12. ARS memories are known in the art, and the term "atomic resolution storage" includes ARS memories or other memories of similar capacity.

A port 26 permits data to be transferred from processor 22 to an external computer 14. Processor 22 may also include an associated switch 28 on the pen body for turning on processor 22 and the associated circuitry. A reset switch 30 on the pen body or incorporated into the ball point assembly and sensor can permit a user to effectively start recording data at a default location, as further explained below.

Figure 2:
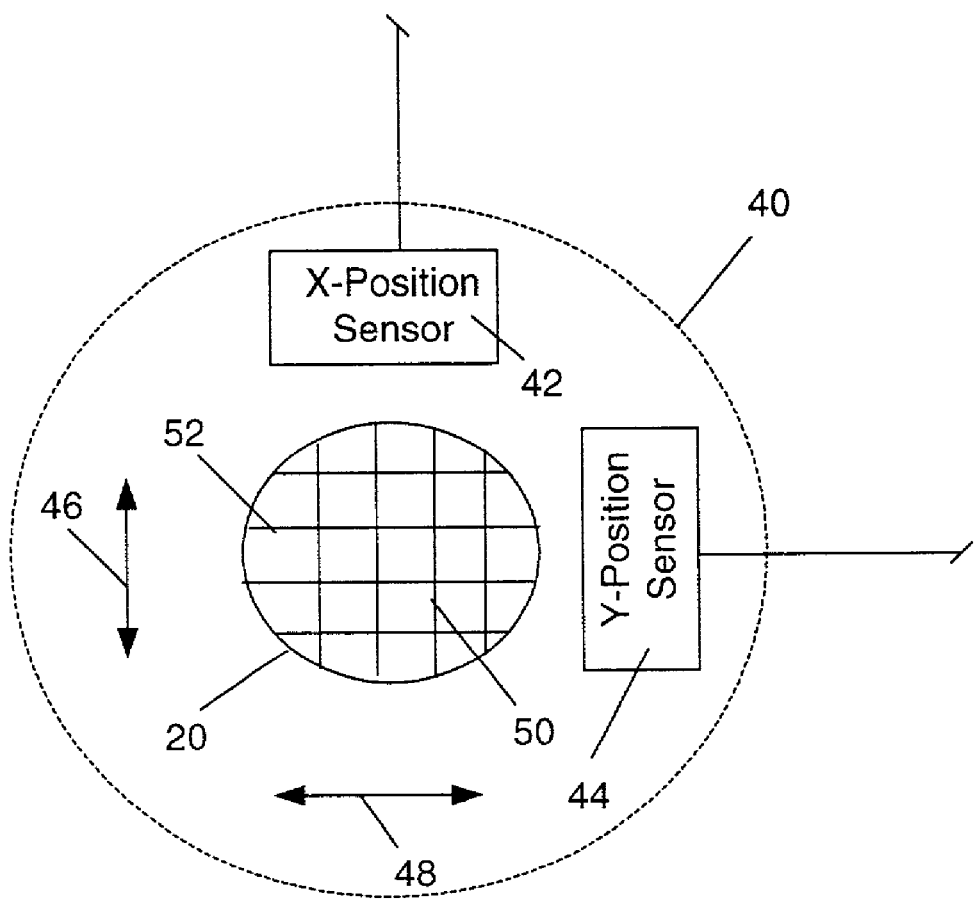
FIG. 2 is a diagram of position sensors for detecting motion of the electronic pen.

FIG. 2 is a diagram of exemplary circuitry for detecting motion of ball point 20. Dashed line 40 represents pen body 12 shown in cross-section. Sensor 24 may be implemented with an X-position sensor 42 and a Y-position sensor 44 located within the pen body proximate ball point 20. X-position sensor 42 detects motion of ball point in a first direction as indicated by arrows 48 and Y-position sensor 44 detects motion of ball point 20 in an orthogonal direction as shown by arrows 46. Ball point 20 may include magnetized lines in orthogonal directions as shown by lines 50 and 52 for detection by X-position sensor 42 and Y-position sensor 44. The sensors may be sampled at a particular rate and the corresponding electronic signals recorded by processor 22. The ball motion can also be sensed by other types of marks on the rotating ball, such as physical grooves (detected by a sensor sensitive to grooves) or markings on the ball showing infrared contrast to a sensor based on infrared reflectivity or transmission. One skilled in the art will recognize that the use of light energy in wavelengths other than infrared could be used for the ball motion sensing.

Figure 3:
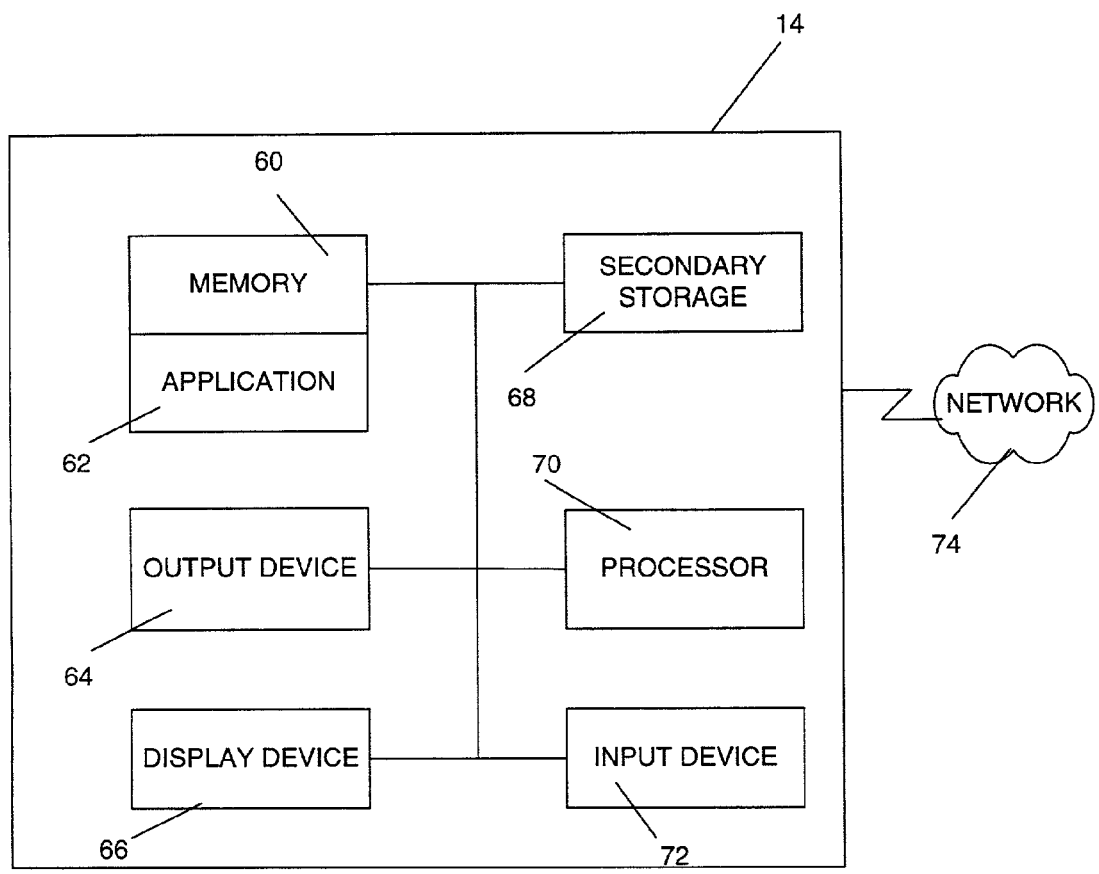
FIG. 3 is a diagram of an exemplary computer for connection with an electronic pen for downloading motion data.

FIG. 3 is a diagram of exemplary computer 14 for receiving downloaded position data from processor 22. Computer 14 can include a connection with a network 74 such as the Internet. Computer 14 typically includes a memory 60, a secondary storage device 68, a processor 70, an input device 72, a display device 66, and an output device 64.

Memory 60 may include random access memory (RAM) or similar types of memory, and it may store one or more applications 62 for execution by processor 70. Applications 62 may correspond with software modules to perform processing for the functions described below. Secondary storage device 68 may include a hard disk drive, floppy disk drive, CD-ROM drive, or other types of non-volatile data storage. Processor 70 may execute applications or programs stored in memory 60 or secondary storage 68, or received from the Internet or other network 74. Input device 72 may include any device for entering information into computer 14, such as a keyboard, key pad, cursor-control device, touch-screen (possibly with a stylus), or microphone. Display device 66 may include any type of device for presenting visual information such as, for example, a computer monitor, flat-screen display, or display panel. Output device 64 may include any type of device for presenting a hard copy of information, such as a printer, and other types of output devices include speakers or any device for providing information in audio form. Computer 14 can possibly include multiple input devices, output devices, and display devices.

Although computer 14 is depicted with various components, one skilled in the art will appreciate that this computer can contain additional or different components. In addition, although aspects of an implementation consistent with the present invention are described as being stored in memory, one skilled in the art will appreciate that these aspects can also be stored on or read from other types of computer program products or computer-readable media, such as secondary storage devices, including hard disks, floppy disks, or CD-ROM; a carrier wave from the Internet or other network; or other forms of RAM or ROM. The computer-readable media may include instructions for controlling computer 14 to perform a particular method.

Figure 4:
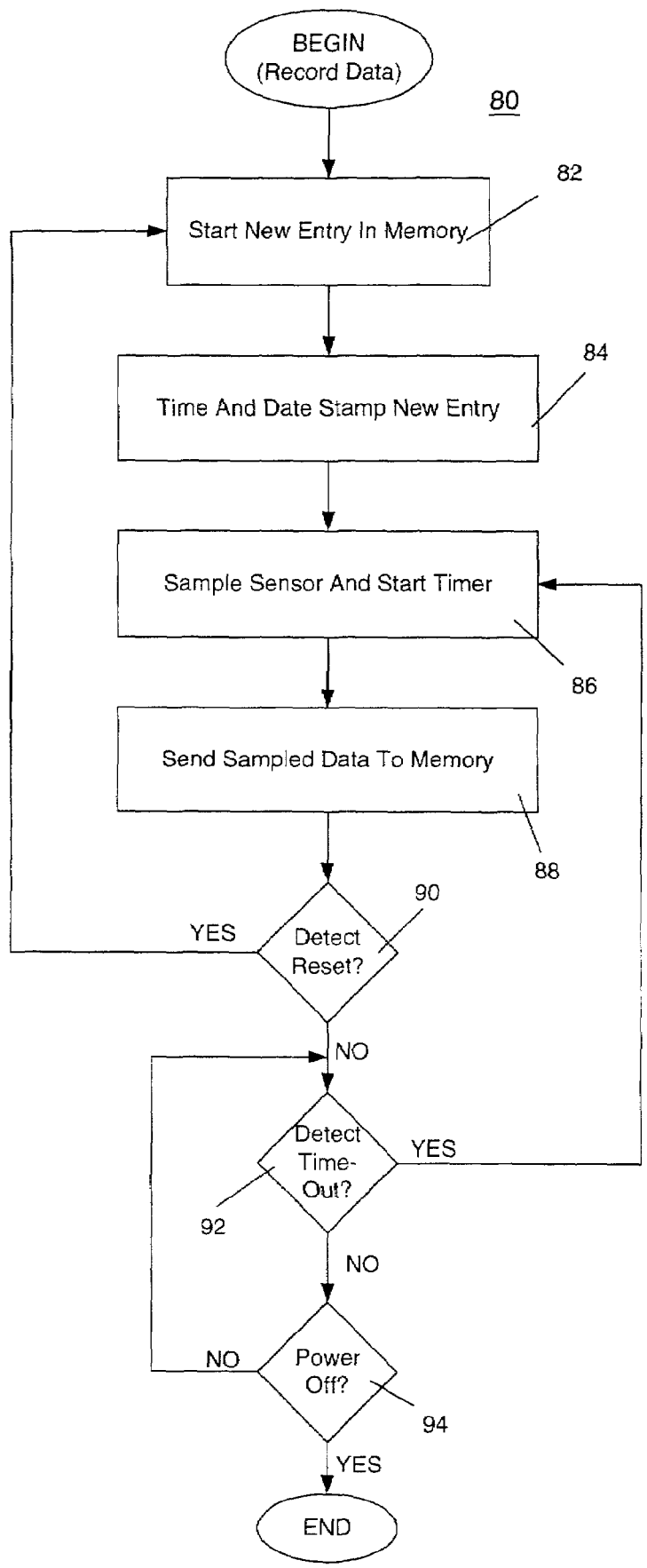
FIG. 4 is a flow chart of a method for recording data using an electronic pen.

FIG. 4 is a flow chart of a method 80 for recording data using electronic pen 10. Method 80 may be implemented in software modules stored within memory 32 and executed by processor 22. In method 80, processor 22 starts a new entry 32 upon power up (step 82). The new entry may also be time and data stamped using an internal clock with processor 22 (step 84). As the user writes with electronic pen 10, processor 22 samples sensor 24 and starts a timer (step 86). Processor 22 sends the sample data to memory 32 to be stored as data points, and it determines if it detects a reset as entered through a reset button 30 (step 90) or by pressure detected in the rolling ball point. If it detects a reset, method 80 then returns to step 82 in order to start another new entry in memory. Otherwise, processor 22 determines if it detects a time-out (step 92), which indicates another time to sample the sensor. If so, it returns to step 86 to sample the sensor and record additional position data. If processor 22 does not detect a time-out, it continues to wait for a time-out unless power is turned off (step 94). The sampling typically occurs at a rate to provide sufficient motion data to reconstruct the motion of the pen, such as several times per second. Certain implementations can use, for example, a variable sampling rate which would sample at a higher rate for fast ball motion, and at a lower rate for slow ball motion. These implementations provide the advantage that the ball motion is recorded and stored onboard the pen itself.

Figure 5:
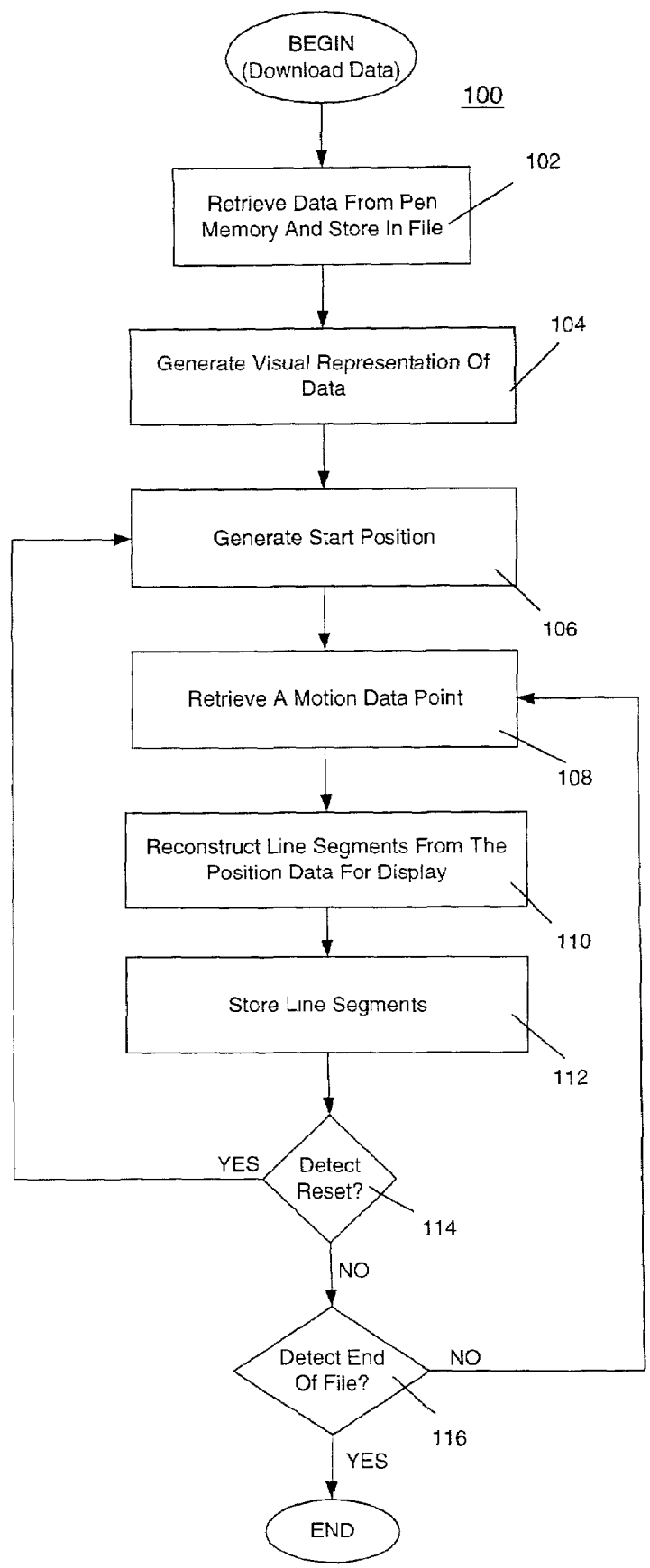
FIG. 5 is a flow chart for downloading data from an electronic pen.

FIG. 5 is a flow chart of a method 100 for downloading data from electronic pen 10 into computer 14. Method 100 may be implemented in software modules stored in memory 60 and executed by processor 70. In method 100, computer 14 retrieves data from memory 32 in electronic pen 10 and stores the data in a file (step 102). Computer 14 then generates a visual representation of the data (step 104). In particular, computer 14 generates a start position, which for example may constitute a position at a particular location on the default page (step 106). Computer 14 retrieves a motion data point from the file (step 108), and it reconstructs line segments from the position data for display (step 110). The line segments can be stored in memory (step 112). By repeatedly retrieving data points, computer 14 may extrapolate them to generate lines as written by a user. Various algorithms can be used to create smooth lines from the line segments; for example, data extrapolation techniques and algorithms are known in the art for creating lines from data points.

Computer 14 determines if it detects a reset indication in the file, which would have been generated through reset switch 30 (step 114). It detects a reset, computer 14 generates a new start position and returns to step 106. Otherwise, computer 14 determines if it detects an end of the file indicating the end of the motion data (step 116); if it is not at the end of the file, computer 14 returns to step 108 to retrieve and extrapolate additional data points.

While the present invention has been described in connection with an exemplary embodiment, it will be understood that many modifications will be readily apparent to those skilled in the art, and this application is intended to cover any adaptations or variations thereof. For example, different pen configurations and software processing may be used without departing from the scope of the invention. This invention should be limited only by the claims and equivalents thereof.

The invention claimed is:

1. An electronic pen for recording motion data relating to use of the pen, comprising:
 a pen body;
 a ball mounted in the pen body;
 a sensor in the pen body, located proximate the ball, for detecting motion of the ball and converting the motion into corresponding electronic signals;
 a memory in the pen body, electronically coupled to the sensor, for receiving the electronic signals and storing corresponding data related to the motion, the data including data points related to positions of the ball and enabling extrapolation to generate lines representing the motion of the ball; and
 a circuit, electronically coupled to the sensor and the memory for sampling the sensor at a particular rate and controlling transmission of the corresponding electronic signal from the sensor to the memory, the circuit including a timer for determining the particular rate at which the sensor is sampled.

2. The electronic pen of claim 1, further including a removeable ink cartridge, disposed within the pen body, for applying ink to the ball.

3. The electronic pen of claim 1, further including a port, located on the pen body and electronically coupled to the memory, for use in transferring the data from the memory to an external device.

4. The electronic pen of claim 1, further including a module for receiving the data and for converting the data into a visual representation of the motion of the ball.

5. The electronic pen of claim 4, further including a module for storing the visual representation.

6. The electronic pen of claim 1 wherein the sensor includes dual sensors for detecting directions from which orthogonal ball motions can be reconstructed.

7. The electronic pen of claim 6 wherein the memory stores as the data coordinates representing the directions from which the orthogonal ball motions can be reconstructed.

8. The electronic pen of claim 1 wherein the memory stores an indication of a set of the motion data and a default location for a start of the corresponding motion.

9. The electronic pen of claim 1 wherein the memory comprises an atomic resolution storage memory.

10. A method for recording motion data relating to use of a pen having a pen body, a ball mounted in the pen body, a memory, and a sensor located proximate the ball, comprising:
 detecting motion of the ball using the sensor;
 sampling the sensor at a particular rate using a circuit electronically coupled to the sensor and to the memory, the circuit including a timer for determining the particular rate at which the sensor is sampled;

converting the motion into corresponding electronic signals;

receiving the electronic signals;

controlling transmission of the electronic signals from the sensor to the memory using the circuit; and staring in the memory, based upon the electronic signals, corresponding data related to the motion, the data including data points related to positions of the ball and enabling extrapolation to generate lines representing the motion of the ball.

11. The method of claim 10, further including providing a removeable ink cartridge, disposed within the pen body, for applying ink to the ball.

12. The method of claim 10, further including electronically transferring the data from the memory to an external device.

13. The method of claim 10, further including: receiving the data; convening the data into a visual representation of the motion of the ball.

14. The method of claim 13, further including storing the visual representation.

15. The method of claim 10 wherein the detecting step includes using dual sensors for detecting directions from which orthogonal ball motions can be reconstructed.

16. The method of claim 15 wherein the storing step includes storing as the data coordinates representing the directions from which the orthogonal ball motions can be reconstructed.

17. The method of claim 10 wherein the storing step includes storing an indication of a set of the motion data and a default location for a start of the corresponding motion.

18. The method of claim 10 wherein storing step includes using an atomic resolution storage memory for storing the data.

19. The electronic pen of claim 1, wherein the circuit is capable of varying the rate at which the sensor is sampled based upon the motion of the ball.

20. The electronic pen of claim 1, farther comprising:

a first switch for turning on and off the circuit;

a second switch for enabling a user to store in the memory a reset indication to start storing data related to the motion of the ball from a default location stored in memory; and wherein:

the sensor comprises an X-position sensor and a Y-position sensor located within the pen body proximate the ball, and the X-position sensor and a Y-position sensor remotely sense ball motion by movement of features on the ball; and the circuit further comprises a timer for determining the particular rate at which the sensor is sampled, and wherein the circuit is capable of varying the rate at which the sensor is sampled based upon the motion of the ball.

21. The method of claim 10, further including the step of changing the rate at which the sensor is sampled based upon the motion of the ball.

* * * * *

UNITED STATES PATENT AND TRADEMARK OFFICE
CERTIFICATE OF CORRECTION

PATENT NO.       : 7,193,618 B2                                          Page 1 of 1
APPLICATION NO.  : 09/726325
DATED            : March 20, 2007
INVENTOR(S)      : Charles C. Morehouse It is certified that error appears in the above-identified patent and that said Letters Patent is hereby corrected as shown below:

In column 5, line 6, in Claim 10, delete "staring" and insert -- storing --, therefor.

In column 5, line 18, in Claim 13, delete "convening" and insert -- converting --, therefor.

In column 6, line 8, in Claim 20, delete "farther" and insert -- further --, therefor.

Signed and Sealed this

Seventeenth Day of February, 2009

JOHN DOLL
*Acting Director of the United States Patent and Trademark Office*